United States Patent [19]

Lawlor

[11] 3,848,546

[45] Nov. 19, 1974

[54] PALLET

[75] Inventor: James J. Lawlor, Glen Rock, N.J.

[73] Assignee: P.D.Q. Plastics, Inc., Newark, N.J.

[22] Filed: Aug. 6, 1973

[21] Appl. No.: 385,855

[52] U.S. Cl. .................................. 108/52, 108/58
[51] Int. Cl. ...................... B65d 19/24, B65d 19/38
[58] Field of Search ............................. 108/51, 58

[56] References Cited
UNITED STATES PATENTS

| | | | |
|---|---|---|---|
| 3,404,642 | 10/1968 | Belcher et al. | 108/51 |
| 3,481,285 | 12/1969 | Yellin | 108/58 |
| 3,580,190 | 5/1971 | Fowler | 108/58 |
| 3,654,876 | 4/1972 | Achs | 108/51 |
| 3,720,176 | 3/1973 | Munroe | 108/58 |

Primary Examiner—Casmir A. Nunberg
Attorney, Agent, or Firm—Popper, Bain, Bobis, Gilfillan & Rhodes

[57] ABSTRACT

A pallet having support legs extending full length along both longitudinal side edges, below the load bearing surface; the support legs provided with internal, transverse, integral bridges that divide the legs into a plurality of separate compartments; horizontally elongated slots in the support legs for receiving the tines of a fork-lift.

7 Claims, 4 Drawing Figures

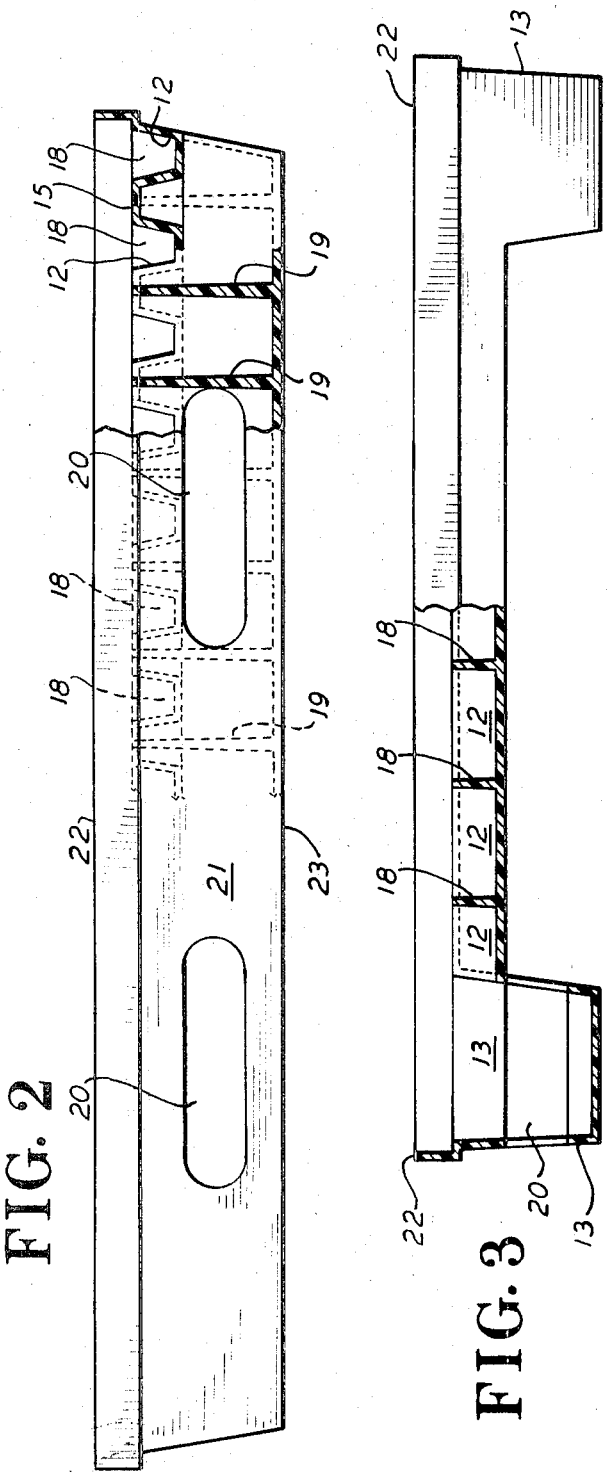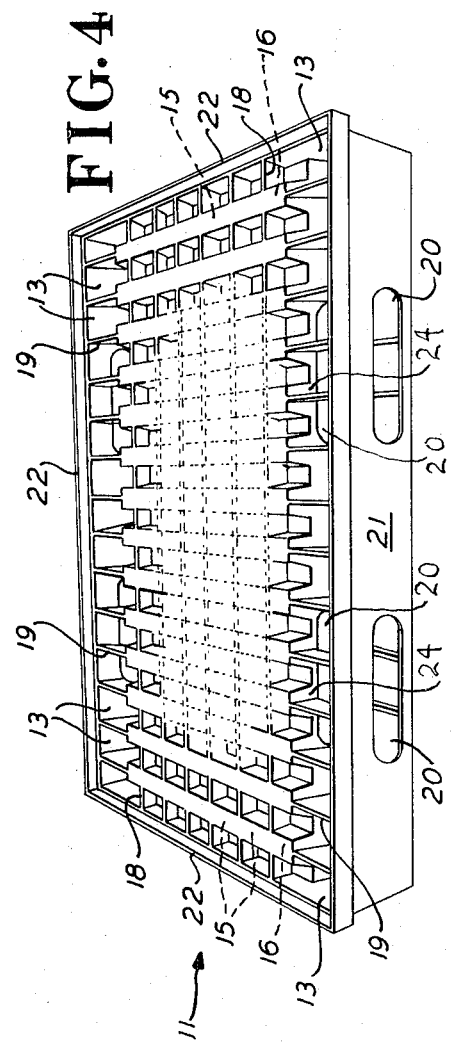

PALLET

BACKGROUND OF THE INVENTION

1. Field of Invention:

This invention relates generally to pallets for holding, storing, and moving material, and particularly to pallets having a single, full-length, longitudinal leg at each opposite longitudinal side, for supporting the load bearing surface of the pallet, and so constructed as to be relatively free from planar distortion of the load bearing surface.

2. Description of Prior Art:

Pallets have for a long time been extensively used for holding, storing and moving material stacked on them by means of a fork-lift or crane. Pallets find increased utility as their durability is increased. Wooden pallets absorb moisture if exposed to it and may weaken and rot. Metal pallets are generally too costly. Plastic pallets made of appropriate plastics are resistant to moisture and rotting, and if made of sufficiently dense and tough plastic materials, are resistant to chipping and peeling. They are easy to maintain in a sanitary condition because they can be washed and cleaned without difficulty. Due to the limited elastic properties of plastic bodies, plastic pallets may bend under heavy load conditions and may break. Thus it is necessary to make them thick, so that they shall be resistant to bending and breaking in use. Unfortunately, this may increase the weight of the pallet to an undesirable degree, and increase its costs to the point where it may be economically unsound to use the plastic pallet. Thus the construction of the pallet becomes a design contest between: decreasing the amount of the materials used to make them economically acceptable and increasing the amount of materials used to make them strong, so that they will not fail. In addition, pallets with small supporting surface on the legs exert great footprint concentrated force on items on which they are stacked.

SUMMARY OF THE INVENTION

It has been found that a pallet can be constructed which uses a dense, tough, plastic material, wherein the concentration of weight is widely distributed by reason of increased footprint. (Footprint is the term applied to the weight support contact area of the leg upon the surface that the pallet rests on). When a conventional pallet is loaded with merchandise, the concentration of weight on the conventional small leg contact area may be so great as to cause the pallet's load bearing surface to be deflected. This may not be so serious, but it may eventually weaken the pallet structure so that it cracks and breaks. What is most serious, however, is the footprint of the leg of a pallet loaded with merchandise and placed on top of another pallet loaded with merchandise. The footprint of the pallet may be so small as to concentrate the weight of articles on the pallet on a small area so as to cause the collapse of the containers stacked on the underlying pallet, and to cause damage to the merchandise contained therein. A pallet designed with a greater footprint becomes a safer means for avoiding damage to goods under the pallet. Conventional pallets may have six or nine separate legs. The present pallet has one large elongated leg extending the entire length of the long side of the rectangular pallet, and has a similar leg on the other side. This distributes the weight on the load bearing surface over a much greater area than is the case with the multiple small-leg pallet, and the footprint correspondingly becomes approximately three times greater than the footprint of the conventional pallet, with six or nine separate legs. The pallet with one compartmented leg on each side extending full length of the side of the pallet is highly resistant to distortion, and greatly reduces the potential for damages occurring to merchandise when one pallet is stacked on top of the merchandise on another pallet. It is even possible to expand the inventive concept to further increase footprint by providing not only opposite full-length longitudinal legs, but also providing a middle leg. The problem of picking up the pallet with a fork-lift is not defeated by a full-length longitudinal leg, because such longitudinal legs are provided with slots to receive tines of a fork-lift. In providing walls in the leg, which divide it into compartments, great strength and resistance to deflection of the pallet is provided. In addition, such pallets are more easily stackable on storage racks, because the legs run the full length of the pallet, and it is not necessary to place them precisely on the rack as is the case with the pallet provided with small separate legs; such pallets must have their legs brought into accurate registration with the support arms of the rack, otherwise they may slip from the rack, discharging the merchandise which they hold, and cause costly damage. Not only is it possible to add a third, or middle leg, but it is also possible to add latitudinal full-length legs with slots for the insertion of a fork-lift tines. This provides the ultimate in rigidity and strength, there being provided legs on all four sides.

DRAWINGS

These objects and advantages as well as other objects and advantages may be attained by the device shown by way of illustration in the drawings in which:

FIG. 2 is a side elevational view taken on the Line 2—2 in FIG. 1;

FIG. 3 is a side elevational view taken on the Line 3—3 in FIG. 1, and

FIG. 4 is a side perspective view of the pallet.

PREFERRED EMBODIMENT

Figure 1:
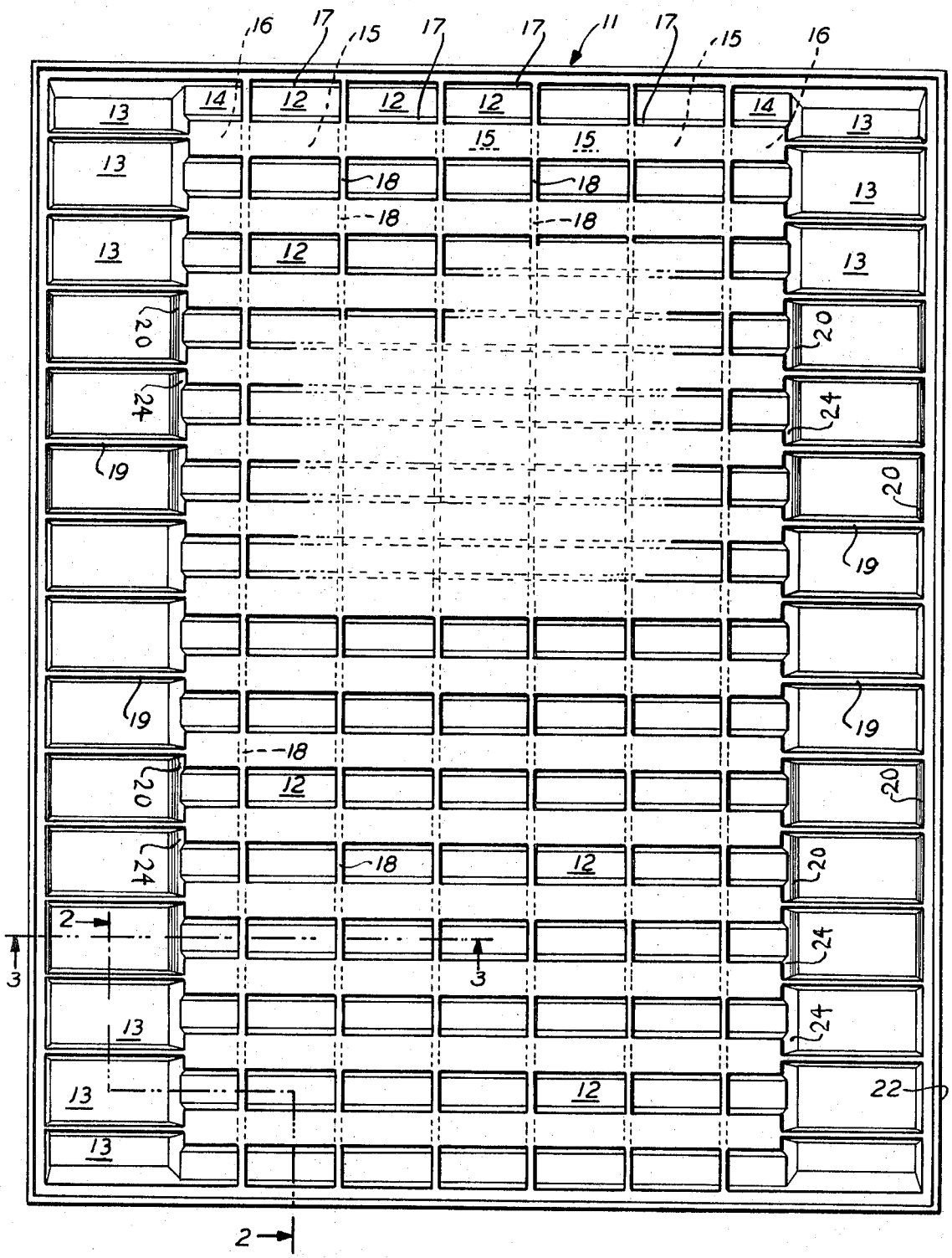
FIG. 1 is a top plan view of a pallet having full-length longitudinal legs.

Referring now to the drawings in detail, the pallet is a generally rectangular body 11 molded preferably from high density polyethylene, non-foamed. It is provided with a plurality of top indentations 12, which are generally all equal to each other, except for the end of indentations 14 in each rank or row, which indentations 14 are cut off or shortened by reason of the legs 13. The top indentations 12, 14 are arranged in latitudinal ranks which extends generally from one longitudinal side of the pallet to the other longitudinal side, except for the space occupied by the legs 13. Thus it will be seen by way of illustration in FIG. 1, that there are five whole indentations 12 in each latitudinal rank, with partial indentations 14 at each end of the rank, beyond which there are the legs 13. Numerous ranks of indentations 12 are disposed in spaced relation to each other, and in this manner, they accommodate a plurality of corresponding opposite bottom indentations 15 on the underside or bottom of the pallet 11, with partial end indentations 16 at the end of each of bottom indentations 14. Since the pallet is molded from plastic material, in order to accomplish release from the mold, the side walls 17 are tapered progressively narrower downwardly. Likewise the side walls of the bottom indentations 15 are tapered progressively narrower upwardly. The bottom indentations 15, 16, are also arranged in latitudinal ranks as are the top indentations 12, 14. The top indentations 12, 14 share common side walls 17 with the adjacent bottom indentations 15, 16. The top indentations 12 are generally equal to each other, and are also equal to the bottom indentations 15 which are also equal to each other. The short end indentations 14 of the top and the short end indentations 16 of the bottom are likewise equal to each other, except that the indentations 16 of the bottom have end walls at both ends.

The longitudinal end walls 18 are common to the adjacent cavities, 12, 14 in each rank of top cavities, and the longitudinal end walls 18 are also common to each adjacent cavity 15, 16 in the ranks of bottom cavities 15, 16 or indentations. Adjacent cavities 12 share common end walls 18 with each other, and the bottom cavities 15 also share common end walls 18 with each other. These end walls 18 are disposed linearly in the same plane in both the top and the bottom cavities 12, 15, 14, 16. These end walls 18 run longitudinally full-length in the body, and have their top edges coplanar with the load-bearing surface defined by the top of the bottom indentations 15, and this bottom edge of the end walls 18 are likewise coplanar with the surface defined by the lowest portion of the top indentations 12 as shown by the dotted lines in FIG. 2. The elongated hollow downwardly extending support legs 13 are disposed on opposite longitudinal portions of the rectangular body 11. As will be seen in FIGS. 2 and 3 the support legs 13 are much deeper than the top and bottom indentations 12, 15, 14, 16, and are preferably three times deeper. The support legs 13 extend the entire length of rectangular body 11 but they are divided into a plurality of separate compartments by integral, generally vertical bridges 19. The bridges 19 top edge are generally coplanar with the load-bearing surface defined by the top of the bottom indentations 15, so as to provide a load-bearing surface extending to the edge of the body 11. These vertical bridges 19 in the legs 13 and the longitudinal bridges 18 provide high resistance to deformation and twisting of the load-bearing surface. The bridges 19 are tapered from the load-bearing surface downwardly again to provide for release of the body 11 from the mold in which it is formed.

In order to provide means for lifting the body 11 at its longitudinal edge, the elongated slots 20 are provided in the outer walls 21 and in the inner walls 24 of the legs 13. The corresponding adjacent portions of the bridges 19 are also cut away to admit the tines of the fork-lift when inserted into the slots 20. FIG. 3 discloses that the legs 13 are spaced sufficiently far apart latitudinally in the body so that the tines of the fork-lift may be inserted longitudinally under the body 11.

By reason of the greater surface area 23 of the legs 13, the footprint of the pallet is vastly increased over the footprint of small separate legs without impairing ease of handling, and thereby decreasing weight concentration of the load upon the underlying surface.

The design may, of course, be varied by adding latitudinal end legs (not shown), in addition to the longitudinal legs 13. Likewise a medial leg (not shown) may be provided between the legs 13 shown in FIG. 3 to provide even greater freedom from the load-bearing surface being subjected to twisting and deformation. An upstanding flange 22 may be provided peripherally on the body 11 to retain merchandise on the load-bearing surface. While the flange 22 is an optional feature, it is advantageous in that present Railroad Freight Rule 1015 provides for the free return of pallets equipped with this feature.

The provision of full-length longitudinal legs 13 divided into separate compartments by the bridges 19, provides great freedom from distortion. The provision of longitudinal bridges which are defined by the end walls 18 provide great longitudinal stability and freedom from twisting. Yet with the full length longitudinal legs 13, a fork-lift may approach and lift the pallet either latitudinally or longitudinally. A stacker crane (frequently automated to seek and select a particular pallet) can approach this pallet and insert its blade or tines between the legs 13 longitudinally, or its tines latitudinally. The inherent strength of this pallet is such that load deformation will be less than the allowable ½ inch deflection which might prevent the pallet's use in an automated system. The cooperation of the continuous legs 13 and the continuous walls 18 provide great freedom from longitudinal distortion. Latitudinal distortion is minimized by the bridges 19 in the legs 13 with the rigidity provided by the side walls 17, and the floors and roofs of the top 12 and bottom 15 cavities, all cooperating with each other. Then by insuring both longitudinal and latitudinal rigidity, the cooperating elements provide a pallet of high resistance to distortion under load conditions.

I claim:

1. A pallet comprising
   a. a generally rectangular, integrally molded load-bearing body,
   b. a top surface on the load bearing body,
   c. a plurality of indentations in the top surface, spaced apart from each other,
   d. a floor at the bottom of each top indentation,
   e. the spaces between the top indentations defining bottom indentations,
   f. side walls of the top indentations converging toward each other downwardly,
   g. side walls of the bottom indentations converging toward each other upwardly,
   h. adjacent top and bottom indentations having common side walls,
   i. the top and bottom indentations having end walls disposed linearly in the same plane,
   j. the top of each end wall of the top indentations coinciding with the plane defined by the top surface,
   k. the bottom of each end wall of the bottom indentations coinciding with the plane defined by the bottoms of the floors of the top indentation,
   l. a full-length, elongated, hollow, support leg at each opposite longitudinal side of the body, open at the top, and extending below the plane defined by the bottom of the top indentations,
   m. each support leg provided with vertical, integral, latitudinal bridges defining a plurality of separate compartments in the legs,
   n. the top of the bridges coplanar with the plane defined by the top surface,
   o. horizontally opposite slots in the support legs in their longitudinal sides, positioned below the plane defined by the bottom of the floors in the top indentations,
p. the slots spaced upwardly from the bottom edge of the legs,
q. the portions of the bridges in the legs opposite to the slots, cut away to admit lifting devices into the legs through the slots.

2. A pallet according to claim 1 and the legs spaced apart latitudinally sufficiently to receive a lifting device between them.

3. A pallet according to claim 1 and a marginal upstanding flange at the peripheral edge of the load-bearing surface.

4. A pallet according to claim 1 in which the plane defined by the bridges in the legs is offset from, and generally parallel to the plane defined by the side walls of adjacent top and bottom indentations.

5. A pallet according to claim 1 in which the top and bottom indentations are arranged in latitudinally elongated ranks between the longitudinal side legs on the top surface.

6. A pallet according to claim 1 in which the top and bottom indentations are generally equal to each other.

7. A pallet according to claim 5 in which the latitudinal ranks are in general parallelism with each other.

* * * * *